(12) United States Patent
Sommer et al.

(10) Patent No.: US 11,383,481 B2
(45) Date of Patent: Jul. 12, 2022

(54) LAMINATE AND METHOD OF MAKING SAME

(71) Applicant: Reifenhaeuser GmbH & Co.KG Maschinenfabrik, Troisdorf (DE)

(72) Inventors: Sebastian Sommer, Troisdorf (DE); Michael Maas, Roesrath (DE); Claudio Cinquemani, Cologne (DE); Markus Jansen, Duesseldorf (DE); Nicolas Quick, Winterberg (DE)

(73) Assignees: REIFENHAEUSER GMBH & CO. KG MASCHINENFABRIK, Troisdorf (DE); PFNONWOVENS HOLDING S.R.O, Prague (CZ)

( * ) Notice: Subject to any disclaimer, the term of this patent is extended or adjusted under 35 U.S.C. 154(b) by 492 days.

(21) Appl. No.: 15/401,127

(22) Filed: Jan. 9, 2017

(65) Prior Publication Data

US 2017/0203539 A1    Jul. 20, 2017

(51) Int. Cl.
*B32B 5/08* (2006.01)
*B32B 5/14* (2006.01)
(Continued)

(52) U.S. Cl.
CPC .............. *B32B 5/145* (2013.01); *B32B 3/263* (2013.01); *B32B 5/022* (2013.01); *B32B 5/08* (2013.01); *B32B 5/26* (2013.01); *B32B 7/028* (2019.01); *B32B 7/04* (2013.01); *B32B 7/05* (2019.01); *B32B 27/12* (2013.01); *B32B 27/32* (2013.01);
(Continued)

(58) Field of Classification Search
CPC ........... B32B 5/145; B32B 7/05; B32B 3/263; B32B 5/08; B32B 5/26; B32B 7/02; B32B 7/04; B32B 27/12; B32B 27/32; B32B 37/06; B32B 38/0036; D01D 5/088;
(Continued)

(56) References Cited

U.S. PATENT DOCUMENTS 5,393,599 A * 2/1995 Quantrille ................. B32B 5/26
                                                442/57
6,613,704 B1    2/2003 Arnold
(Continued)

FOREIGN PATENT DOCUMENTS

DE         10105784 A      8/2002

*Primary Examiner* — Jeffry H Aftergut
*Assistant Examiner* — Jaeyun Lee
(74) *Attorney, Agent, or Firm* — Andrew Wilford

(57) ABSTRACT

A laminate is made by first making by melt-blowing or spunbonding of multicomponent, thermoplastic, and endless filaments a first nonwoven layer lying generally in a plane and having a predetermined shrinkage capacity or potential parallel to the plane and making of thermoplastic and endless filaments a second nonwoven layer also lying generally in a respective plane and having a shrinkage capacity or potential that is smaller than that of the first nonwoven layer. The two layers are directly juxtaposed flatly on each other, and the directly juxtaposed first and second layer are bonded together only at bonded regions while leaving an array of unbonded regions distributed over a surface of the two bonded-together nonwoven layers. Then only the first nonwoven layer is shrunk so that the second layer bunches in the unbonded regions and is there raised transverse to a plane of the bonded-together layers.

14 Claims, 3 Drawing Sheets

(51) Int. Cl.
| | |
|---|---|
| D01D 5/088 | (2006.01) |
| B32B 37/06 | (2006.01) |
| B32B 37/30 | (2006.01) |
| B32B 38/00 | (2006.01) |
| B32B 37/14 | (2006.01) |
| B32B 5/02 | (2006.01) |
| B32B 5/26 | (2006.01) |
| B32B 27/32 | (2006.01) |
| B32B 27/12 | (2006.01) |
| D04H 5/06 | (2006.01) |
| D04H 1/4374 | (2012.01) |
| D04H 3/018 | (2012.01) |
| D04H 3/147 | (2012.01) |
| B32B 7/04 | (2019.01) |
| B32B 7/05 | (2019.01) |
| B32B 3/26 | (2006.01) |
| D04H 3/007 | (2012.01) |
| D04H 3/16 | (2006.01) |
| B32B 7/028 | (2019.01) |

(52) U.S. Cl.
CPC ............ *B32B 37/06* (2013.01); *B32B 37/144* (2013.01); *B32B 37/30* (2013.01); *B32B 38/0036* (2013.01); *D01D 5/088* (2013.01); *D04H 1/4374* (2013.01); *D04H 3/007* (2013.01); *D04H 3/018* (2013.01); *D04H 3/147* (2013.01); *D04H 3/16* (2013.01); *D04H 5/06* (2013.01); *B32B 2250/02* (2013.01); *B32B 2250/03* (2013.01); *B32B 2250/20* (2013.01); *B32B 2262/0253* (2013.01); *B32B 2262/0284* (2013.01); *B32B 2262/12* (2013.01); *B32B 2307/54* (2013.01); *B32B 2307/732* (2013.01); *B32B 2307/736* (2013.01); *B32B 2323/04* (2013.01); *B32B 2323/10* (2013.01)

(58) Field of Classification Search
CPC ...... D04H 1/4374; D04H 3/007; D04H 3/147; D04H 3/16; D04H 5/06
See application file for complete search history.

(56) References Cited

U.S. PATENT DOCUMENTS

| | | | |
|---|---|---|---|
| 7,005,395 | B2 | 2/2006 | Zafiroglu |
| 7,201,816 | B2 | 4/2007 | Zafiroglu |
| 7,763,339 | B2 | 7/2010 | Groitzsch |
| 7,854,813 | B2 * | 12/2010 | Sommer ................. D04H 1/50 156/167 |
| 7,981,357 | B2 * | 7/2011 | Sommer ................. D04H 3/10 264/555 |
| 2003/0059587 | A1 | 3/2003 | Grimm |
| 2005/0095943 | A1 * | 5/2005 | Griffin ................. B29C 31/047 442/352 |
| 2006/0068176 | A1 * | 3/2006 | Zafiroglu ................. B32B 7/04 428/198 |
| 2011/0250816 | A1 * | 10/2011 | Fujiwara ................. B32B 27/02 442/358 |

* cited by examiner

LAMINATE AND METHOD OF MAKING SAME

FIELD OF THE INVENTION

The present invention relates to a laminate and to a method of making a laminate.

BACKGROUND OF THE INVENTION

It is known to make a laminate having at least two juxtaposed layers of nonwoven comprised of continuous filaments, in particular continuous filaments of a thermoplastic polymer. The juxtaposed layers of nonwoven are bonded together only locally to form bonded regions and separate unbonded regions that are distributed over the surface of the laminate. The invention also relates to a laminate having at least two juxtaposed layers of nonwoven made of monofilament. Within the scope of the invention, layers of nonwoven made of monofilament are used, monofilaments being different from staple fibers because of their more or less endless length. Staple fibers have much shorter lengths of for example 10 mm to 60 mm than basically endless monofilaments.

It is often desirable in practice to make nonwoven products and/or nonwoven layers having a voluminous characteristic. These nonwoven products should have a relatively great thickness and/or a relatively high volume. One possibility for this is to impose a "3D structure" with a pronounced structural orientation crosswise and/or at a right angle to the surface of the nonwoven (in the z direction).

Such a "3D structure" is achieved according to the prior art in particular by embossing a single layer of nonwoven or a nonwoven laminate. A nonwoven having crimped fibers, for example, may be used for this purpose. The embossing of the nonwoven leads to formation of the 3D structure. Second, however, in the compressed areas produced by embossing, the thickness of the nonwoven is reduced.

There are, however limits to the embossing method with respect to speed and achievable product width. With material of a lower basis weight in particular, the achievable thickness is not normally satisfactory. The nonwovens treated in the above-described manner are not usually sufficiently stable under pressure and have an inadequate restoring capacity regions subjected in use to significant compression.

OBJECTS OF THE INVENTION

It is therefore an object of the present invention to provide an improved laminate and method of making same.

Another object is the provision of such an improved laminate and method of making same that overcomes the above-given disadvantages, in particular that does not have the disadvantages described above so that the finished laminate has a high volume and/or a great thickness and at the same time is very stable even after being compressed with considerable force.

A further object is to achieve in the laminate good restoring capacity while producing it in a simple manner.

SUMMARY OF THE INVENTION

A laminate is made by first making by melt-blowing or spunbonding of multicomponent, thermoplastic, and endless filaments a first nonwoven layer lying generally in a plane and having a predetermined shrinkage capacity or potential parallel to the plane and making of thermoplastic and endless filaments a second nonwoven layer also lying generally in a respective plane and having a shrinkage capacity or potential that is smaller than that of the first nonwoven layer. The two layers are directly juxtaposed flatly on each other, and the directly juxtaposed first and second layer are bonded together only at bonded regions while leaving an array of unbonded regions distributed over a surface of the two bonded-together nonwoven layers. Then only the first nonwoven layer is shrunk so that the second layer bunches in the unbonded regions and is there raised transverse to a plane of the bonded-together layers. The result is a robust workpiece with raised areas at the unbonded regions where the first layer has shrunk.

A highly recommended embodiment of the invention is characterized in that the first layer of the nonwoven is created as a spunbond nonwoven by a spunbond process. This embodiment of the invention has proven to be particularly successful. The multicomponent filaments and/or bicomponent filaments for the first layer of nonwoven are spun by a spinning machine and/or spinneret and then are preferably guided through a cooler for cooling. The filaments are advantageously cooled with a fluid medium in particular with cooling air in the cooler. It is within the scope of the invention that the filaments emerging from the cooler are then guided through a stretcher that elongates the filaments. In particular by adjusting the stretching parameters, it is possible to impart to the first layer of nonwoven formed from the filaments a higher shrinkage potential than that of the second layer of nonwoven. The stretched filaments are then deposited on a collection surface, preferably on a screen belt, to form the first layer of nonwoven. According to a first embodiment, at least one diffuser is inserted between the stretcher and the collection surface the filaments are guided through it. It is within the scope of the invention that the at least one diffuser has side walls opposite each other and diverging with respect to the direction of flow of the filaments. A particularly recommended embodiment of the invention is characterized in that the assembly of the cooler and the stretcher is designed as a closed system. In this closed assembly, there is no other supply of air from the outside except for the supply of cooling medium and/or cooling air in the cooler. Such a closed system has proven especially suitable for creating the first layer of nonwoven within the scope of the invention. Basically, the first layer of nonwoven can also be made by a melt-blown process.

Another highly recommended embodiment of the method according to the invention is characterized in that the second layer of nonwoven is created as a spunbond nonwoven by a spunbond process. For this spunbond process and/or the respective spunbond device, the description given above for the first layer of nonwoven and/or its features are also applicable. According to another embodiment, the second layer of nonwoven is made by a melt-blown process.

As already explained above, a spunbond process has proven especially suitable for making the first layer of nonwoven. It has been found that the object of the invention is attained in a particularly effective and functionally reliable manner with the shrinkage according to the invention, if the closed assembly described above is used, and if at least one diffuser is additionally used between the stretcher and the collection surface according to a particularly preferred embodiment variant. It has already been indicated that the shrinkage potential for the first layer of nonwoven can be adjusted and/or controlled in a highly targeted manner, based on the stretching parameters of the spunbond process.

It is advisable for the ratio of the basis weight of the first layer of nonwoven (greater shrinkage) to the second layer of nonwoven (less shrinkage) to be 25:75 to 75:25. This is preferably also true of the ratio of two corresponding layers of nonwoven in a three-layer or multilayer laminate. The mass of the first layer of nonwoven in the laminate of the two layers of nonwoven is advantageously up to 70% of the total mass of two joined and juxtaposed nonwoven layers. A recommended embodiment of the invention is characterized in that the first layer of nonwoven is used as a bonded and/or prebonded layer of nonwoven. The first layer of nonwoven is preferably bonded and/or prebonded thermally, for example, being bonded and/or prebonded thermally using a calender. The bonding and/or prebonding is/are preferably accomplished by using an open calendar structure.

It is within the scope of the invention that the different shrinkage capacities and/or the different shrinkage potentials of the two layers of nonwoven are adjusted by using different materials for the monofilaments of the two layers of nonwoven and/or by different method conditions in the production and/or in spinning of the monofilament for the two layers of nonwoven and/or by different filament cross sections of the monofilaments of the two layers of nonwoven and/or by different orientations of the monofilaments in the two layers of nonwoven.

A particularly recommended embodiment of the method according to the invention is characterized in that the shrinkage capacity and/or the shrinkage potential of the first layer of nonwoven is greater in the machine direction (MD) than the shrinkage capacity and/or the shrinkage potential of this first layer of nonwoven crosswise to the machine direction (CD). The machine direction refers in particular to the production direction and/or the travel direction of the first layer of nonwoven in production and/or in spinning of the first layer of nonwoven. During manufacture of the first layer of nonwoven, the filaments for this layer of nonwoven are advantageously deposited on a moving collection belt and preferably on a moving belt and/or screen belt. The machine direction then refers to the travel direction of this layer and/or screen belt in particular. Crosswise to the machine direction (CD) refers in particular to the direction across this travel direction.

In a particularly preferred embodiment of the method according to the invention, a first layer of nonwoven is used in which the ratio of the shrinkage capacity (shrinkage potential) in the machine direction (MD) to the shrinkage capacity (shrinkage potential) across the machine direction (CD) is 1:1 to 3:1, preferably 1.1:1 to 1.6:1, and especially preferably 1.1:1 to 1.5:1. When the shrinkage capacity and/or shrinkage potential is/are mentioned here and below, this refers in particular to the shrinkage capacity and/or shrinkage potential at the activation temperature to which the nonwoven is heated in thermal activation and/or heating. The shrinkage capacity, i.e. the shrinkage potential, also refer(s) to the free shrinkage, i.e. free shrinkage of the first layer of nonwoven without any hindrance/mechanical hindrance on the shrinkage. According to a particularly recommended embodiment of the invention, the shrinkage potential in the MD direction of the first layer of nonwoven is 10 to 60%, preferably 15 to 50% greater than the shrinkage potential in the CD direction.

The shrinkage potential is measured as recommended according to the following measurement method. A square sample of nonwoven with an edge length of 100 mm (square 100 mm×100 mm) is heated in a hot fluid for one minute at the activation temperature. For example, air, water, silicone oil or a similar fluid medium is suitable as the fluid. After removal and cooling of the nonwoven sample, the shrunken lengths are measured, specifically in the machine direction (MD) and crosswise to the machine direction (CD). The shrinkage is reported in percentage against 100 mm. Thus, if a nonwoven sample is 60 mm long after shrinkage in a measured direction, then the nonwoven sample has a shrinkage of 40% in this direction. The ratio of the shrinkage potentials MD/CD in the two directions can be determined and reported in this way.

It is recommended that the first layer of nonwoven should have a shrinkage potential of 20 to 80% in the machine direction (MD) at the activation temperature. According to one embodiment of the invention, the shrinkage potential in the machine direction (MD) and/or crosswise, in particular perpendicular, to the machine direction (CD) is utilized only in the range of 10 to 80%, preferably in the range of 10 to 50% of the respective total shrinkage potential. Thus, for example, if the first layer of nonwoven has a shrinkage potential of 50% in the machine direction and 50% of this shrinkage potential is utilized, then this layer of nonwoven has a final length of 75% of the original length in the machine direction, i.e. it has a 25% smaller length. The displacement and/or increase in the unbonded regions of the second layer of nonwoven crosswise to and in particular at a right angle to the plane of two joined and juxtaposed nonwoven layers (in z direction) is satisfactory only when there is an adequate shrinkage potential difference between the first layer of nonwoven (greater shrinkage) and the second layer of nonwoven (lesser shrinkage). In this relationship it has proven successful for the second layer of nonwoven to have a shrinkage potential of at most 50% the activation temperature, preferably at most 30% and especially at most 20% of the shrinkage potential of the first layer of nonwoven. Thus, if the first layer of nonwoven has a shrinkage potential of 50%, for example, then the second layer of nonwoven (less shrinkage) preferably has a shrinkage potential of less than 10%. It is advisable for the second layer of nonwoven (less shrinkage) to have a shrinkage potential of 0 to 50% at the activation temperature, preferably 0 to 20% and especially preferably from 0 to 10%.

A particularly recommended embodiment of the method according to the invention is characterized in that the first nonwoven layer is made from multicomponent filaments, in particular bicomponent filaments, with a core-sheath configuration. The difference between the melting point of the core component and the melting point of the sheath component is advantageously greater than 5° C. or according to a preferred embodiment is greater than 10° C. It is within the scope of the invention that the core component consists of or essentially consists of a plastic from the group of polyolefin, polylactide. The preferred polyester for use is polyethylene terephthalate (PET) and the recommended polyolefin is polypropylene (PP). In addition it is within the scope of the invention why the sheath component of the multicomponent filament and/or bicomponent filaments of the first layer of nonwoven to consist and/or essentially consist of a plastic from the group polyolefin, polyester copolymer, polylactide copolymer (CoPLA). Polyethylene (PE) is advantageously used as the polyolefin and polyethylene terephthalate copolymer (CoPET) is preferred as the polyester copolymer. Preferred core-sheath combinations for the multicomponent filaments and/or bicomponent filaments of the first nonwoven layer include PET/PE, PET/PP, PET/CoPET, PLA/CoPLA and PLA/PP. The mass ratio of the core component to the sheath component is 50:50 to 90:10 according to one embodiment. It is within the scope of the method according to the invention that these mass ratios of the core-sheath configuration can be varied freely during production without shutting down the machine.

It is within the scope of the invention for the second nonwoven layer to consist of multicomponent filaments, in particular bicomponent filaments, with a core-sheath configuration and/or with a side-to-side configuration. If the multicomponent filaments and/or bicomponent filaments of the second nonwoven layer have a core-sheath configuration according to a particularly preferred embodiment, then it is recommended that the core consists of a plastic from the group polyester, polylactide (PLA), polyolefin. The preferred polyester is polyethylene terephthalate (PET). The polyolefin recommended for the core component is polypropylene (PP) in particular. The recommended sheath component for the multicomponent filaments and/or bicomponent filaments of the second nonwoven layer is preferably a plastic from the group polyester copolymer, polylactide copolymer (CoPLA), polyolefin. The recommended polyolefin is in particular polyethylene. As the polyester copolymer, polyethylene terephthalate copolymer (CoPET) is advantageously used. If bicomponent filaments with a core-sheath configuration are used for the second nonwoven layer, then according to one embodiment, both the core component and the sheath component are made of a polyolefin, in particular polypropylene and/or polyethylene. The core component is preferably formed by a polypropylene and the sheath component is advantageously formed either by polyethylene or by a polypropylene that is different from the polypropylene of the core component. The multicomponent filaments and/or bicomponent filaments used for the second nonwoven layer may also have a side-to-side configuration according to one embodiment. In this embodiment both side components preferably consist of a polyolefin, in particular polypropylene and/or polyethylene. Essentially monocomponent filaments may also be used for the filaments of the second nonwoven layer. It is then recommended that these monocomponent filaments consist of a polyolefin, preferably polyethylene or polypropylene.

Three most especially preferred embodiments of bicomponent filaments of the first nonwoven layer and the second nonwoven layer are given below:

| First nonwoven layer | Second nonwoven layer |
| --- | --- |
| Core/sheath PET/PE | Core/sheath PET/PE |
| Core/sheath PET/CoPET | Core/sheath PET/CoPET |
| Core/sheath PLA/CoPLA | Core/sheath PLA/CoPLA |

In these embodiments the material combinations of the bicomponent filaments of the first nonwoven layer that exhibits greater shrinkage correspond to the material components of the second nonwoven layer that has less shrinkage. The higher shrinkage capacity of the first nonwoven layer is preferably adjusted through the spinning conditions and/or the stretching conditions in the production of the filaments and/or through the amounts of the core component and/or sheath component and/or through differences between the individual plastics. The different shrinkage potentials of the layers are advantageously adjusted by the spinning conditions and/or stretching conditions during manufacture of the filaments, especially when working with the same material combinations for the first and second nonwoven layers and, according to recommendations, it is also adjusted through the filament speed. A lower filament speed (in m/min) during manufacture of filaments is characteristic in particular of the first nonwoven layer (greater shrinkage) and a higher filament speed (in m/min) during manufacture of filaments is characteristic of the second nonwoven layer (less shrinkage). It is recommended that the speed of filaments during manufacture of the filaments of the first nonwoven layer amounts to 1000 to 3000 m/min, for example, and the filament speed during manufacture of filaments of the second nonwoven layer should amount to more, or significantly more, than 3000 m/min. Fundamentally, however, the different shrinkage potentials of the two nonwoven layers can also be adjusted in other ways. Additional embodiments with respect to the synthetic components used for the first nonwoven layer and the second nonwoven layer are shown in the following table:

| First nonwoven layer | Second nonwoven layer |
| --- | --- |
| Core/sheath PET/PE | Core/sheath PP/PE |
| Core/sheath PLA/PP | Core/sheath PP/PP |
| Core/sheath PET/PE | Side/side PP/PE |
| Core/sheath PLA/PP | Side/side PP/PP |
| Core/sheath PET/PE | Mono PE |
| Core/sheath PLA/PP | Mono PP |

In addition to nonwoven layers of bicomponent filaments (core/sheath and/or side/side), this table also lists nonwoven layers of monocomponent filaments labeled as "mono." The greater shrinkage capacity of the first nonwoven layer is preferably adjusted here through the spinning conditions and/or stretching conditions during manufacture of the bicomponent filaments and/or through the proportions of the core and/or sheath components and/or through the cross section of the bicomponent filaments of the nonwoven layers. It should be pointed out that in all the embodiments mentioned above, the outside surface of the filaments of the first nonwoven layer consists of a synthetic and/or a type of synthetic (for example, polyethylene), which is also present on the outside surface of the filaments of the respective second nonwoven layer. However, these synthetics are not necessarily identical, and two polyethylenes can also be different from one another, for example, with regard to melting point or the like. The embodiment of the same type of synthetic on the outside surface of the filaments is most especially preferred within the scope of the invention. This will be discussed in greater detail below.

According to the invention, the laminate of the two nonwoven layers is bonded such that bonded regions and unbonded regions are distributed over the surface. According to the recommended embodiment of the invention, the bonding of the laminate of the two nonwoven layers is carried out as thermal bonding. It is within the scope of the invention for the monofilaments of the first nonwoven layer to be fused to monofilaments of the second nonwoven layer in this thermal bonding operation. The melting points of the monofilaments then form the bonded regions of two joined and juxtaposed nonwoven layers. The bonding of the laminate of the at least two layers of the nonwoven and/or of the two layers of nonwoven is advantageously carried out by at least one calendar roller. It is also within the scope of the invention that a (first) calendaring roller of the calendar has embossing surfaces and also has regions free of embossing surfaces. The second roller (mating roller) of the calendar is then advantageously designed to be smooth and/or essentially smooth. The spacing between neighboring embossing surfaces of the first calendaring roller then preferably amounts to at least 0.5 mm, especially at least 1 mm and advantageously at most 10 mm, with the recommendation being at most 5 mm. The embossing surfaces may be formed by round spots, ellipses, diamonds and the like, as well as by continuous or interrupted lines. The embossing surfaces may be straight or with a flourish, arrayed regularly or irregularly and/or ordered mainly in the machine direction (MD) and/or crossways to the machine direction (CD). The thermal bonding may also be accomplished with the help of a hot fluid, in particular with the help of hot air. A chemical bonding and/or mechanical bonding is/are fundamentally also possible, in particular by needling, for example, by water jet needling. There should be assurance that the bonding is not implemented over the full area—as described above.

It is within the scope of the invention for the shrinkage of the first nonwoven layer to be activated thermally. The thermal activation preferably takes place with the help of at least one hot fluid and/or by contact with a hot surface. In the latter embodiment variant, the first nonwoven layer with greater shrinkage is preferably in contact with the hot surface. The hot surface may be in particular part of a roller. It is recommended that the thermal activation be carried out such that the shrinkage of the first nonwoven layer takes place uniformly over the surface of the layer. According to a preferred embodiment, a colder surface, in particular a second roller having a colder surface, is downstream from the hot surface, in particular the roller having the hot surface. In the preferred use of the rollers mentioned above, it is recommended that the second roller with the colder surface should have a lower peripheral velocity compared with the first roller. The extent of the shrinkage can be controlled relatively easily in this way. According to one embodiment, thermal activation can take place in a hot air field such as a tension frame oven, for example. For the thermal activation the laminate of the two nonwoven layers can be passed through an oven. The thermal activation may also take place by UV light, microwave radiation and/or laser radiation. It should be emphasized that the thermal activation within the scope of the method according to the invention can be carried out both "inline" immediately after implementation of the upstream method steps or "offline" and thus uncoupled from the upstream method steps. The thermal activation may thus take place basically "offline" at a different time and at a different location. Then the laminate, which has not yet been thermally activated and is thus not yet very voluminous, can be transported easily and in a space-saving manner to this processing site.

It is advisable for the activation temperature of the thermal activation to be between 80° C. and 170° C., preferably between 80° C. and 160° C. According to one embodiment, the activation temperature is 90° C. to 140° C., in particular 110° C. to 130° C. If according to a preferred embodiment the first nonwoven layer has bicomponent filaments with a core component of polyethylene terephthalate (PET) and a sheath component of a polyolefin, in particular of polyethylene or polypropylene, then the activation temperature is advantageously 90° C. to 140° C. and in particular 100° C. to 140° C. In one embodiment of the first nonwoven layer with bicomponent filaments, whose core component consists of polyethylene terephthalate (PET) and whose sheath component consists of polyethylene terephthalate copolymer (CoPET), the activation temperature is preferably 100° C. to 160° C. If the first nonwoven layer has bicomponent filaments with a core component of polylactide (PLA) and a sheath component of a polyolefin, in particular of a polyethylene or a polypropylene, then the activation temperature is advantageously 80° C. to 130° C.

It is within the scope of the invention for an (additional) bonding of the laminate of the at least two nonwoven layers and/or of the two nonwoven layers to take place after activation and/or thermal activation of the shrinkage. Then this bonding may preferably be carried out as formal bonding, for example, by hot air or with the help of microwave or IR radiation. According to a particularly recommended embodiment, the (additional) bonding and/or the (additional) thermal bonding takes place with the help of at least one calendar. It is within the scope of the invention for the melting point and/or softening point of the synthetic and/or the synthetics at the surface of the filament of at least one nonwoven layer preferably both nonwoven layers to be exceeded in this (additional) thermal bonding. Due to this additional bonding and/or thermal bonding after activation of the shrinkage, the 3D state of the laminate created in the activation and/or thermal activation is more or less stabilized.

To solve this technical problem, the invention also relates to a laminate having at least two nonwoven layers of monofilaments, in particular of a thermoplastic synthetic resin, spacedly and or directly juxtaposed with one another, in particular layers of a thermoplastic synthetic resin, a first nonwoven layer being a spunbond layer or as a melt-blown layer and comprising multicomponent filaments, in particular bicomponent filaments, a second nonwoven layer on the first nonwoven layer having multicomponent filaments, in particular bicomponent filaments—and/or monocomponent filaments, and the first nonwoven layer is designed to shrink because of the thermal shrinkage in the direction of its plane. As a result of this shrinkage, regions of the second nonwoven layer are designed to be shifted and/or raised crosswise to the plane of the two joined and juxtaposed nonwoven layers. The laminate therefore has a relatively pronounced fiber orientation in z direction and/or crosswise, in particular at a right angle to the surface of the laminate of the two nonwoven layers. It is within the scope of the invention for the laminate of the two nonwoven layers to be designed to be smooth and/or flat on the outside of the first nonwoven layer that has greater shrinkage. The "outside" here refers to the side of the first nonwoven layer that is not attached to the second nonwoven layer. The above-described outside of the first nonwoven layer is preferably flatter and/or smoother and in particular much flatter and/or much smoother than the outside of the second nonwoven layer.

It is within the scope of the invention for the laminate of the at least two nonwoven layers spacedly and/or directly juxtaposed with one another to be bonded such that bonded regions and unbonded regions are relatively oriented so that they are distributed over the surface of the laminate. Furthermore, it is within the scope of the invention that bonded regions of the second nonwoven layer are designed to be shifted and/or raised transversely, in particular at a right angle to the plane of the laminate as a result of the shrinkage of the first nonwoven layer.

A most especially preferred embodiment, which deserves special attention within the scope of the present invention, is characterized in that at least one synthetic component and/or the synthetic component on the outside surface of the monofilaments of the first nonwoven layer corresponds to a synthetic component and/or the synthetic component at the outside surface of the monofilaments of the second nonwoven layer. This results in advantages in particular with respect to the bonding and/or thermal bonding of the laminate. According to a recommended embodiment, when the one synthetic component on the outside surface of the monofilaments of the first nonwoven layer and the one synthetic component on the outside surface of monofilaments of the second nonwoven layer are polyolefins, in particular polyethylene or polypropylene. According to another embodiment of the invention, the synthetic component on the outside surface of the monofilaments of the first nonwoven layer and the synthetic component on the outside surface of the monofilaments of the second nonwoven layer are copolymers of a polyester, in particular a copolymer of polyethylene terephthalate (CoPET) or a copolymer of a polylactide (CoPLA).

According to an especially recommended embodiment of the invention, the melting point of the synthetic component on the outside surface of the monofilaments of the first nonwoven layer is higher than the temperature (activation temperature) at which the shrinkage of the first nonwoven layer is and/or can be activated thermally. The monofilaments of the first nonwoven layer are advantageously configured as multicomponent filaments and/or bicomponent filaments having a core-sheath configuration, and the melting point of the sheath component of these monofilaments of the first nonwoven layer is preferably higher than the temperature (activation temperature) at which the shrinkage of the first nonwoven layer can be activated and/or can be activated thermally. A very recommended embodiment of the invention is characterized in that the temperature (activation temperature) at which the shrinkage of the first nonwoven layer can be activated and/or is activated is at least 5° C., preferably at least 10° C., and especially preferably at least 15° C. below the melting point of the lowest melting synthetic component of the nonwoven layer laminate exposed to the shrinkage activation. Thus, according to a recommended embodiment variant, the activation temperature is up to 30° C., preferably up to 25° C. below the melting point of the lowest melting synthetic component of the nonwoven layer laminate. Fundamentally, the activation temperature may also be up to 25° C. above the melting point of the lowest melting synthetic component of the nonwoven layer laminate.

According to the invention, the laminate of the two juxtaposed nonwoven layers is bonded, so that bonded regions and unbonded regions are distributed over the surface of the laminate. It is within the scope of the invention for the average minimum spacing between two bonded regions of the laminate to amount to more than 1 mm, preferably more than 1.5 mm and very preferably more than 2 mm.

The thickness D of the laminate (finished laminate) is advantageously 0.2 to 10 mm, preferably 0.2 to 8 mm. A recommended embodiment is characterized in that the thickness D of the laminate (finished laminate) is less than 2 mm, preferably less than 1.8 mm and especially preferably less than 1.5 mm. A proven embodiment is characterized in that the thickness D of the laminate (finished laminate) is less than 1.3 mm, according to recommendation less than 1 mm. The assemblies and/or laminates with these thicknesses are used in particular for hygiene purposes. For other applications, however, the laminate (finished laminate) may also have a thickness of more than 1 mm or more than 2 mm. The thickness is measured according to the standard DIN EN 29073-2 (1982) method A, with a pressure of 0.5 kPa. A "finished laminate" refers in particular to the laminate in which shrinkage has already occurred and in which a subsequent preferred (additional) bonding of the laminate of the nonwoven layers has already been carried out. In producing a laminate having the thickness recommended above, the shrinkage of the first nonwoven layer is advantageously activated at an activation temperature that is preferably at least 5° C., especially preferably at least 10° C., and most especially preferably at least 15° C. below the melting point of the lowest melting synthetic used in the laminate. The assemblies and/or laminates specified above having the above-described thicknesses and the recommended activation temperatures are used in particular for hygiene purposes.

Another embodiment of the invention is characterized in that the thickness D of the laminate (finished laminate) amounts to 0.5 to 8 mm, preferably 1 to 6 mm. The thickness D is again measured according to the measurement methods specified above. With these laminates, the activation temperature is in the range of 25° C. below to 25° C. above the melting point of the lowest melting synthetic used in the laminate. The laminates of this embodiment are advantageously used for technical packages.

A very recommended embodiment of the invention is characterized in that the ratio of the maximum tensile strength of the laminate (finished laminate) in the machine direction (MD) to the highest tensile strength of the laminate crosswise to the machine direction (CD) amounts to 2.5:1 to 1.2:1. Laminates with maximum tensile strength ratios MD/CD in this range have proven to be particularly suitable within the scope of the invention. The method according to the invention for making the laminate is preferably controlled in such a way that MD/CD ratios in this range are achieved. A maximum tensile strength is measured according to DIN EN 29073-3 (1992).

According to one embodiment of the invention, the laminate according to the invention has at least three nonwoven layers, i.e. it has three nonwoven layers. A recommended embodiment is characterized in that the laminate according to the invention comprises at least one three-layer laminate and/or a three-layer laminate with two outer shrinking and/or more shrinking layers and a middle layer that is non-shrinking and/or less shrinking. Another preferred embodiment is characterized in that the laminate is an at least three-layer laminate and/or a three-layer laminate with two outer non-shrinking layers and/or less shrinking layers and one middle shrinking layer and/or more shrinking layer. According to a preferred embodiment variant, the three layers of the laminate each consist of multicomponent filaments and/or bicomponent filaments. It is recommended that the multicomponent filaments and bicomponent filaments of the three layers should have the same synthetic resin on the outer surface. The synthetic resin on the outer surface of the filaments of the three layers is preferably a polyolefin, especially the same polyolefin. Polyethylene or polypropylene is preferably used as the polyolefin. The multicomponent filaments and/or bicomponent filaments of all three layers are advantageously configured with core-sheath configuration and then according to the recommendation the sheath components of the multicomponent filaments and/or bicomponent filaments of all three layers are made of the same synthetic. Preferably all sheath components are made of a polyolefin, preferably the same polyolefin, in particular polyethylene or polypropylene.

For example, the following three layers may also be implemented in a three-layer laminate: first shrinking and/or more strongly shrinking nonwoven layer of bicomponent filaments with a core-sheath configuration PET/PE; second non-shrinking and/or less shrinking nonwoven layer with bicomponent filaments in the core-sheath configuration of PET/PE and a third non-shrinking and/or less shrinking nonwoven layer of bicomponent filaments with a core sheath configuration of PP/PE. The invention is based on the finding that in such a laminate, the shrinkage force, the stiffness and the thermal stability of the polyethylene terephthalate are advantageously combined with the soft feel of the polyolefin layers on the outside. The result is a product with optimal compressive stability.

The invention is based on the finding that a laminate made according to the invention can be designed to be relatively voluminous and may thus have a relatively great thickness, on the one hand, while nevertheless having a satisfactory stability and/or compressive stability, on the other hand. In contrast with many nonwoven products known from the prior art, the laminates according to the invention have a more stable thickness under the influence of loads and the plastic deformation of the laminate is relatively minor under such a load influence. Laminate regions have an excellent restoring capacity after a load and/or after a compressive load. These advantageous properties can also be achieved with a relatively low basis weight of the laminates. The laminates made according to invention are also sufficiently rigid and machine passable.

The method according to the invention is also characterized by the advantage that continuous production of the laminate is readily possible with relatively high production rates without interruption of the production method. The adjustment of the parameters for production of the individual nonwoven layers is highly variable and/or flexible during the method and therefore variable end products can be made without having to interrupt the production method. The activation step for the shrinkage can also be varied with respect to the parameters with no problem. The method according to the invention can be carried out easily "inline" and can also be implemented "offline" with no problem. Shrink activation can thus be uncoupled from the actual laminate production without any problems. In summary, it can be concluded that a laminate according to the invention with a very advantageous 3D-structured surface with a large volume and great thickness can be made easily and inexpensively in an uncomplicated method, while achieving a satisfactory compressive stability of the laminate. Various parameters of the nonwoven layers and/or the resulting laminate can be adjusted in a variable and flexible manner during the production method.

BRIEF DESCRIPTION OF THE DRAWING

The above and other objects, features, and advantages will become more readily apparent from the following description, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing.

SPECIFIC DESCRIPTION OF THE INVENTION

Figure 1:
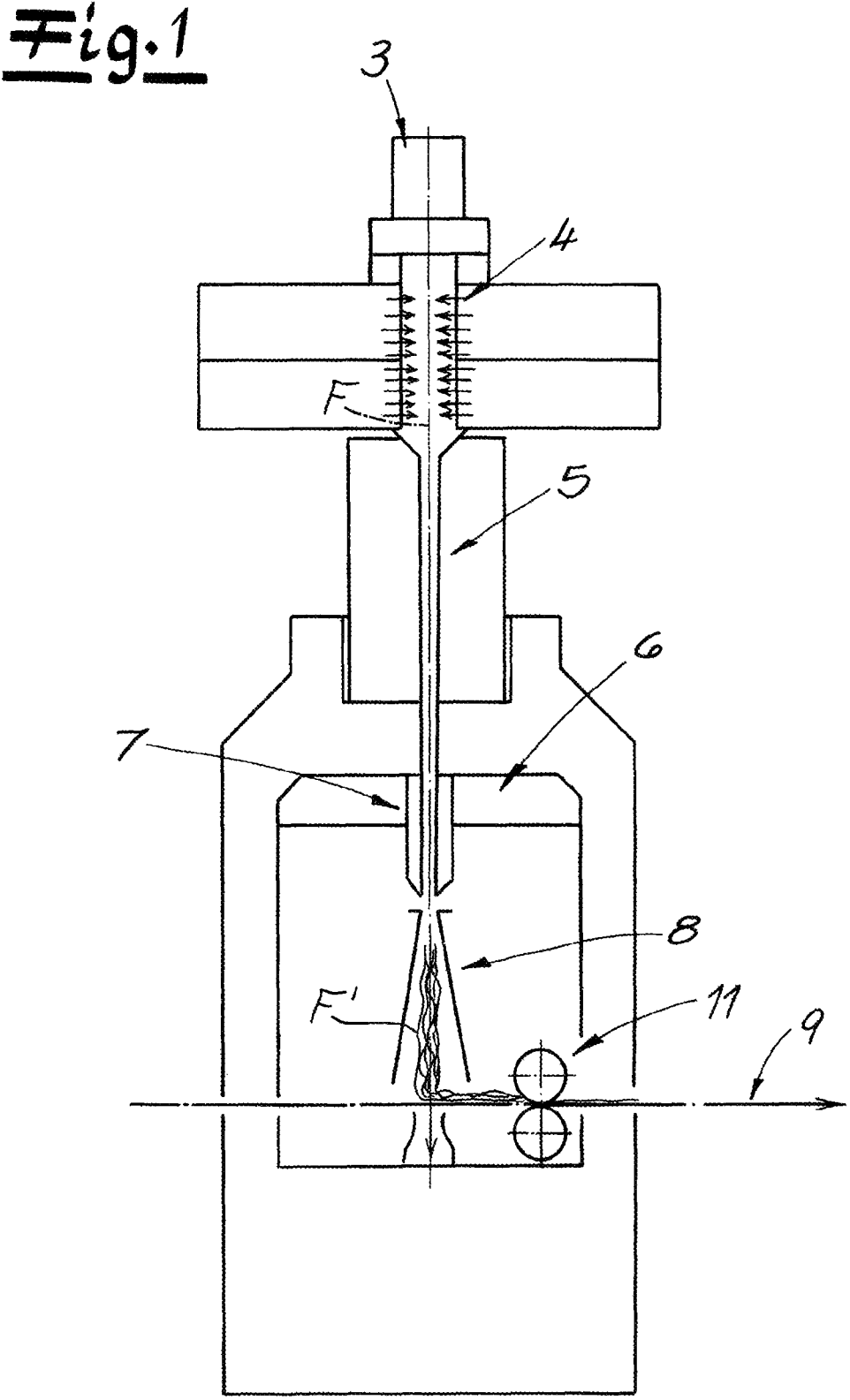
FIG. 1 is a vertical schematic and partly sectional view through an apparatus for making a spunbond nonwoven according to the invention.

As seen in FIG. 1 an apparatus for making nonwoven layers 1 and 2 in the form of spunbond webs for the laminate according to the invention. With this apparatus monofilaments F are made by the spunbond process and deposited to form a spunbond web. The filaments 1 are spun by a spinneret 3 and then are preferably guided through a cooler 4. Here, they are passed through a cooler 4 for cooling. A stretcher 6 with a stretching passage 7 is connected downstream from the cooler 4 to convert them into prestretched filaments F'. An intermediate passage 5 that connects the cooler 4 to the stretcher 6 is preferably and in this embodiment connected to the cooler 4. According to the recommendation and in this embodiment, a diffuser 8 is connected downstream from the stretcher 6 in the direction of flow of the filaments F'.

According to one highly recommended embodiment and in this embodiment, the laminate of the cooler 4 and the stretcher 6 and/or the assembly of the cooler 4, the intermediate passage 5 and the stretcher 6 is designed as a closed system. Except for the supply of cooling air in the cooler 4, there is no additional air supply from the outside into this closed assembly.

In the embodiment according to FIG. 1, only one diffuser 8 is provided downstream from the stretcher 6. Two or more diffusers may also be connected one after the other here. In this embodiment, the filaments F' emerging from the stretcher 6 are passed through the diffuser 8 and then deposited on a deposition screen belt 9 for formation of the nonwoven 1 and/or 2. According to a particularly recommended embodiment of the invention, both nonwoven layers 1 and 2 of the laminate 10 according to the invention are made as a spunbond web using an apparatus like that illustrated in FIG. 1. Basically, one of the nonwoven layers 1 or 2 or both nonwoven layers 1 and 2 may also be made as melt-blown nonwovens according to a melt-blown process.

The nonwoven layers 1 and 2 deposited on the deposition screen belt 9 illustrated in FIG. 1 are then sent for further processing. The (individual) nonwoven layers 1 and 2 are each prebonded after being deposited, namely by a calendar 11 in the embodiment according to FIG. 1. A (single) nonwoven layer 1 and 2 is preferably calendared using an open calendaring structure. Following this, the nonwoven layer 1 is joined with an additional nonwoven layer 2 to form a laminate according to the invention. According to a preferred embodiment, this additional nonwoven layer 1 and 2 may also be made with an apparatus of the type illustrated in FIG. 1 and may be deposited, for example inline on another of the nonwoven layers 1 and 2 that has already been made to form the laminate of two nonwoven layers 1 and 2. It is within the scope of the method according to the invention for this laminate to then be bonded such that bonded regions 12 and unbonded regions 13 are uniformly distributed over the surface of the laminate, giving it a quilted appearance.

Figure 2A:
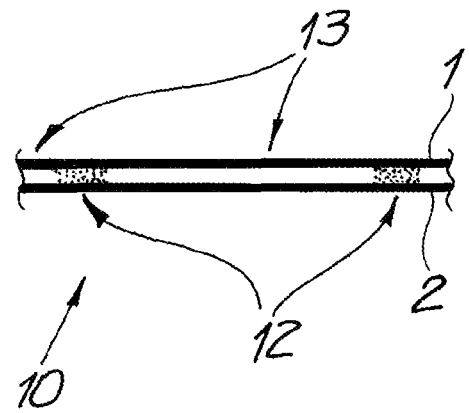
FIGS. 2A-2C are large-scale sections through a laminate according to the invention comprised of a first nonwoven layer and a second nonwoven layer, respectively (FIG. 2A) before the shrink activation, (FIG. 2B) during the shrink activation and (FIG. 2C) after shrink activation.
Figure 2B:
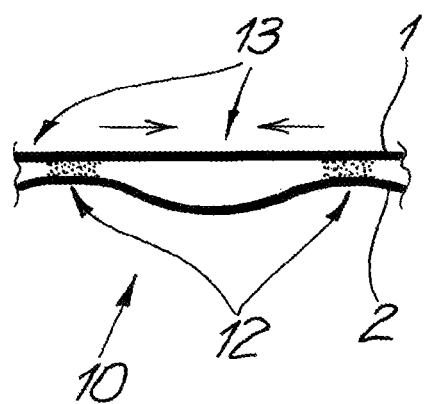
Figure 2C:
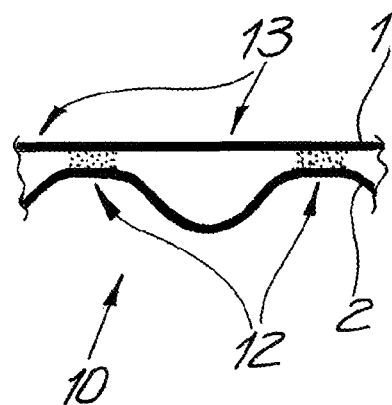

FIGS. 2A-2C show a laminate of a first nonwoven layer 1 and a second nonwoven layer 2. The first nonwoven layer 1 has a higher shrinkage capacity and/or a higher shrinkage potential than the second nonwoven layer 2. In FIG. 2A the laminate is shown prior to shrink activation. The two nonwoven layers 1 and 2 have already been bonded, so that bonded regions 12 and/or bonding spots and unbonded regions 13 are present. According to a preferred embodiment and in this embodiment, the bonding is carried out as a thermal bonding and monofilaments of the two nonwoven layers 1 and 2 are fused to one another in the bonded regions 12 and/or in the bonding spots. The laminate of the two nonwoven layers 1 and 2 is then activated thermally and/or heated to an activation temperature. This causes the first nonwoven layer 1 with the higher shrinkage potential to shrink as shown by arrows in FIG. 2B. Because of the shrinkage and/or because of this contraction of or bunching at the bonded regions 12, unbonded regions of the second nonwoven layer 2 are shifted and/or raised transversely to a plane P of the laminate in particular at a right angle thereto, giving the product a quilted look. FIG. 2C shows the final condition of the laminate after thermal shrinkage. It can be seen that because of the shrink activation and/or because of the shrinkage, a pronounced 3D structure of the laminate and/or laminate 10 with a definite z component is present transversely in particular at a right angle to the surface of the laminate 10.

Figure 3A:
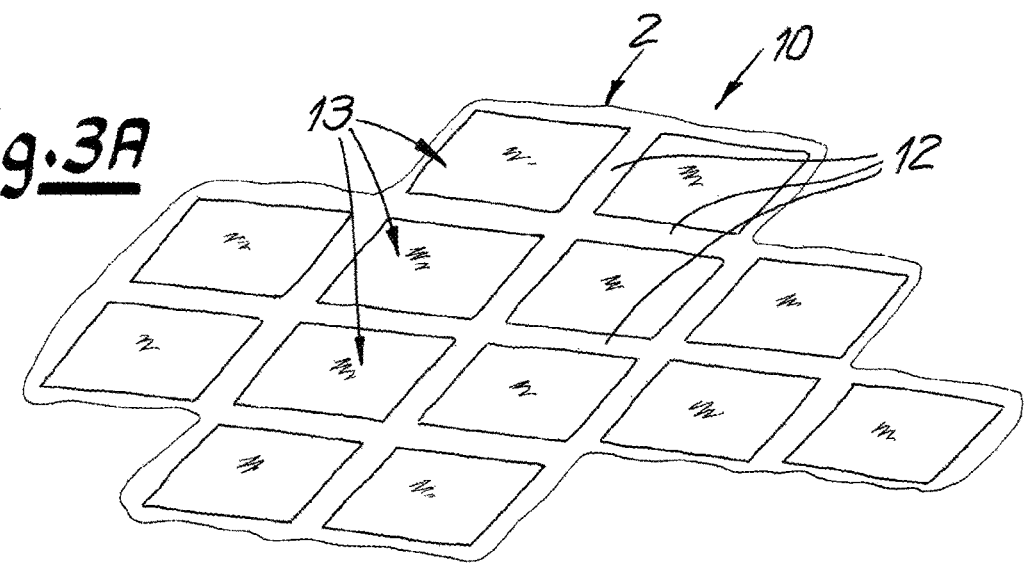
FIGS. 3A-3B are perspective views of a laminate according to the invention respectively (FIG. 3A) before the shrink activation and (FIG. 3B) after the shrink activation.
Figure 3B:
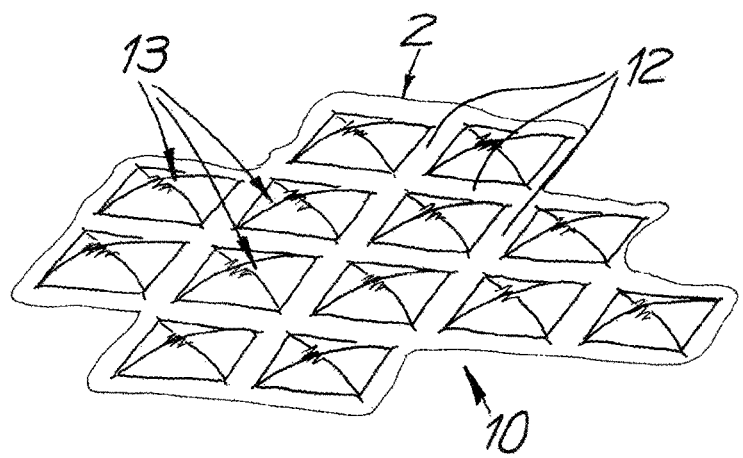

FIG. 3A shows a perspective view of an laminate of two nonwoven layers 1 and 2 in an already bonded state with bonded regions 12 and unbonded regions 13. FIG. 3B shows this laminate after shrink activation with the unbonded regions 13 of the second nonwoven layer 2 raised. FIG. 3B in particular shows that the bonded region 12 is in fact a grid forming a uniform array of square pillow-like unbonded regions 13.

Figure 4A:
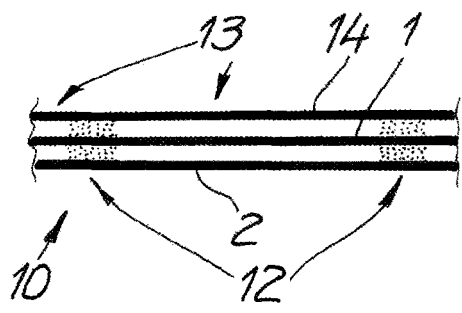
FIGS. 4A-4B are sections through a three-layer laminate according to the invention respectively (FIG. 4A) before shrink activation and (FIG. 4B) after shrink activation.
Figure 4B:
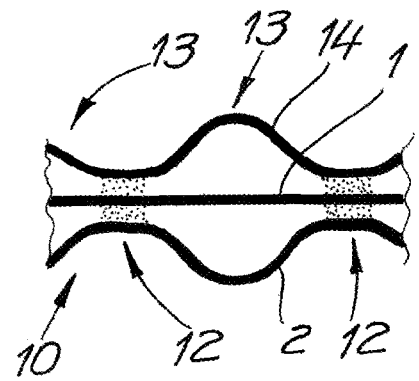

FIGS. 4A-4B show a section through a laminate of three nonwoven layers 1, 2, 14. The middle nonwoven layer 1 has a higher shrinkage capacity and/or a higher shrinkage potential than the two outer nonwoven layers 2 and 14 sandwiching it. These two non-shrinking and/or less shrinking outer nonwoven layers 2 and 14 may be identical but basically different nonwoven layers 2, 14 may also be used as the outer nonwoven layers. FIG. 4A shows the laminate before shrink activation. The laminate of the three nonwoven layers 1, 2, 14 has already been bonded so that bonded regions 12 and/or bonded spots and unbonded regions 13 are present. This three-layer laminate is then activated thermally and/or heated to an activation temperature. This causes the middle nonwoven layer 1 that has the higher shrinkage potential to shrink as shown by arrows here as in FIG. 2B. Because of the shrinkage and/or because of the contraction of the bonded regions 12, unbonded regions of the two outer nonwoven layers 2, 14 are shifted and/or raised transversely from the surface of the laminate, in particular at a right angle to the plane P not shown in FIGS. 4A and 4B. FIG. 4B shows the final condition of the laminate after thermal shrinkage.

We claim:

1. A method of making a laminate, the method comprising the steps of:

spunbonding with a spinneret multicomponent, thermoplastic, and endless first filaments of bicomponent core-sheath configuration having a sheath consisting essentially of polyolefin, polyester copolymer, or polyactide copolymer and a core consisting essentially of polyester or polyactide, then cooling and thereafter stretching the first filaments in a respective closed system into which entry of air is excluded except for cooling to make a first nonwoven layer having a predetermined shrinkage capacity or potential extending in a predetermined machine direction that is greater than a shrinkage capacity or potential of the first nonwoven layer crosswise to the machine direction;

spunbonding with a spinneret multicomponent, thermoplastic and endless second filaments of bicomponent core-sheath configuration having a sheath the same composition as the sheath of the first filaments and a core consisting essentially of polyolefin, polyester, or polyactide, then cooling and thereafter stretching the second filaments in a respective closed system into which entry or air is excluded except for cooling to make a second nonwoven layer also having a respective shrinkage capacity or potential that extends in a predetermined second direction and that is smaller than the shrinkage capacity or potential of the first nonwoven layer in the machine direction;

passing both the first filaments and the second filaments from the respective closed systems through respective diffusers and thereafter depositing the first and second filaments from the respective diffusers to form the first and second layers on a collection surface moving in the machine direction and directly juxtaposing one of the first and second layers flatly on the other of the first and second layers;

bonding the directly juxtaposed first and second layers together only at bonded regions while leaving an array of unbonded regions distributed over a surface of the two bonded-together nonwoven layers;

setting a thickness of the bonded and juxtaposed nonwoven layers to less than 2 mm; and thereafter shrinking the first nonwoven layer so that the second layer bunches in the unbonded regions and is there raised transverse to planes of the bonded-together layers and so that a ratio of a maximum tensile strength of the bonded-together layers in the machine direction parallel to the first direction to a maximum tensile strength of the bonded-together layers parallel to the planes and crosswise to the machine direction is 2.5:1 to 1.2:1.

2. The laminate-making method defined in claim 1, wherein the different shrinkage capacities or potentials of the first and second nonwoven layers are set by using different raw materials for the first and second filaments of the first and second nonwoven layers or by different method conditions during manufacture of the first and second filaments for the first and second nonwoven layers or by different filament cross sections of the first and second filaments of the first and second nonwoven layers or by different orientations of the first and second filaments in the first and second nonwoven layers.

3. The laminate-making method defined in claim 1, wherein the shrinkage capacity of the first nonwoven layer in the machine direction and the shrinkage capacity of the first nonwoven layer crosswise to the machine direction form a ratio of 1:1 to 3:1.

4. The laminate-making method defined in claim 1, wherein the bonding of the two juxtaposed nonwoven layers is a thermal bonding during which the first filaments of the first nonwoven layer are fused to the second filaments of the second nonwoven layer.

5. The laminate-making method defined in claim 1, wherein the bonding of the two joined and juxtaposed nonwoven layers is done with at least one calendar.

6. The laminate-making method defined in claim 1, wherein the shrinking of the first nonwoven layer is effected thermally by exposure to a hot fluid or by contact with a hot surface.

7. The laminate-making method defined in claim 1, wherein making of the layers, bonding of the juxtaposed layers, and shrinking of the first nonwoven layer are carried out inline.

8. The method defined in claim 1, wherein at least one synthetic component on an outer surface of the first filaments of the first nonwoven layer corresponds to a synthetic component on the outer surface of the second filaments of the second nonwoven layer, and a synthetic component on the outer surface of the first filaments of the first nonwoven layer and of the second filaments of the second nonwoven layer is a polyethylene or polypropylene.

9. The method defined in claim 1, wherein a melting point of a synthetic-resin component of the first filaments of the first nonwoven layer is higher on an outer surface of the first filaments of the first nonwoven layer than the temperature at which shrinkage of the first nonwoven layer can be activated, the first filaments of the first nonwoven layer have a core-sheath configuration, and the melting point of the sheaths of these continuous filaments is higher than the temperature at which the shrinkage of the first nonwoven layer can be activated.

10. The method defined in claim 1, wherein a temperature at which the shrinkage of the first filaments of the first nonwoven layer can be activated is at least 5° C. below a melting point of a synthetic component of the two joined and juxtaposed nonwoven layers that melts at a low temperature or of the nonwoven layer laminate exposed to the shrink activation.

11. The method defined in claim 1, further comprising the step of:
    setting an average minimum spacing between the two bonded regions of two joined and juxtaposed nonwoven layers to more than 1 mm.

12. The method defined in claim 1, further comprising the steps of:
    providing a third nonwoven layer like the first layer and of a low shrinkage capacity or potential; and
    laminating the third layer to the first and second layers with the second layer between the first and third layers to form a three-layer laminate.

13. The method defined in claim 1, further comprising the step of:
    spunbonding thermoplastic and endless filaments to make a third nonwoven layer also lying generally in a respective plane and having a respective shrinkage capacity or potential that extends in a predetermined third direction in the respective plane and that is generally the same as the shrinkage capacity or potential of the second nonwoven layer in the second direction, the first layer having a pair of opposite faces to one of which the first layer is directly bonded; and
    directly juxtaposing the third layer flatly to the other face of the first layer with the third direction extending parallel to the second direction crosswise to the machine direction and to the first direction, both the second and third layers being shrunk to bunch on the respective faces of the first layer.

14. The method defined in claim 1, wherein the layers are all heated to shrink at least the first layer.

* * * * *